United States Patent
Gerber, Jr.

(10) Patent No.: US 11,159,556 B2
(45) Date of Patent: Oct. 26, 2021

(54) PREDICTING VULNERABILITIES AFFECTING ASSETS OF AN ENTERPRISE SYSTEM

(71) Applicant: EMC IP Holding Company LLC, Hopkinton, MA (US)

(72) Inventor: Gregory A. Gerber, Jr., Colorado Springs, CO (US)

(73) Assignee: EMC IP Holding Company LLC, Hopkinton, MA (US)

( * ) Notice: Subject to any disclaimer, the term of this patent is extended or adjusted under 35 U.S.C. 154(b) by 229 days.

(21) Appl. No.: 16/664,355

(22) Filed: Oct. 25, 2019

(65) Prior Publication Data

US 2021/0126936 A1 Apr. 29, 2021

(51) Int. Cl.
*H04L 29/06* (2006.01)
*G06N 5/04* (2006.01)
*G06N 20/00* (2019.01)

(52) U.S. Cl.
CPC .......... *H04L 63/1433* (2013.01); *G06N 5/04* (2013.01); *G06N 20/00* (2019.01); *H04L 63/20* (2013.01)

(58) Field of Classification Search
None
See application file for complete search history.

(56) References Cited

U.S. PATENT DOCUMENTS

| 8,495,745 B1 | 7/2013 | Schrecker et al. | |
| 10,038,700 B1* | 7/2018 | Duchin | H04L 63/102 |
| 2008/0307525 A1 | 12/2008 | Nickle | |
| 2010/0153156 A1 | 6/2010 | Guinta et al. | |
| 2014/0245376 A1* | 8/2014 | Hibbert | H04L 63/20 726/1 |
| 2015/0310215 A1 | 10/2015 | McBride et al. | |
| 2016/0248794 A1 | 8/2016 | Cam | |
| 2018/0278642 A1* | 9/2018 | Joy | H04L 63/1433 |

(Continued)

OTHER PUBLICATIONS

Santosh S. Vempala, "The Random Projection Method," Center for Discrete Mathematics and Theoretical Computer Science (DIMACS), Oct. 13, 2006, 48 pages.

(Continued)

*Primary Examiner* — Cai Y Chen
(74) *Attorney, Agent, or Firm* — Ryan, Mason & Lewis, LLP

(57) ABSTRACT

A method includes obtaining vulnerability scan results for a first subset of assets of an enterprise system and populating an observation data structure, based on the obtained vulnerability scan results, indicating which vulnerabilities are observed on respective ones of the assets. The method also includes determining a set of recommendations for missing entries of the observation data structure for a second subset of the assets of the enterprise system utilizing at least one recommender system that comprises at least one similarity function for determining similarity between a first and second sets of vulnerabilities observed on ones of the first and second subsets of the assets. The method further includes predicting vulnerabilities affecting the second subset of assets utilizing a machine learning model and the determined set of recommendations, and applying remediation actions for remediating the predicted vulnerabilities affecting the second subset of the assets.

20 Claims, 9 Drawing Sheets

(56) References Cited

U.S. PATENT DOCUMENTS

2020/0012796 A1* 1/2020 Trepagnier ............... G06N 3/08
2020/0036741 A1 1/2020 Duchin et al.

OTHER PUBLICATIONS

V.D. Blondel et al., "Fast Unfolding of Communities in Large Networks," Journal of Statistical Mechanics: Theory and Experiment, Oct. 9, 2008, 12 pages, vol. 2008, No. 10.

T.G. Kolda et al., "Tensor Decompositions and Applications," Society for Industrial and Applied Mathematics (SIAM) Review, Aug. 2009, pp. 455-500, vol. 51, No. 3.

Béla Bollobás, "Modern Graph Theory," Graduate Texts in Mathematics, 1998, 4 pages, vol. 184.

Olle Häggström, "Finite Markov Chains and Algorithmic Applications," London Mathematical Society Student Texts, 2001, 125 pages.

Wade Shen, "Active Social Engineering Defense (ASED)," DARPA Information Innovation Office (DOD-DARPA-I2O), Nov. 9, 2017, 15 pages.

J. Leskovec et al., "Mining of Massive Datasets," Cambridge University Press, 2011, 513 pages.

First Improving Security Together, "Common Vulnerability Scoring System SIG," https://www.first.org/cvss/, downloaded Apr. 30, 2019, 2 pages.

PCI Security Standards Council, "PCI DSS Quick Reference Guide—Understanding the Payment Card Industry—Data Security Standard Version 3.2.1," PCI Security Standards Council, Jul. 2018, 39 pages.

Michael Roytman, "Predicting Exploitability—Forecasts for Vulnerability Management," RSA Conference, Apr. 16-20, 2018, 39 pages.

F. Yamaguchi et al., "Vulnerability Extrapolation: Assisted Discovery of Vulnerabilities Using Machine Learning," Proceedings of the 5th USENIX Workshop on Offensive Technologies (WOOT), Aug. 2011, 10 pages.

D. Jannach et al., "Recommender Systems: An Introduction," RSA Conference, 2018, 353 pages.

Michael D. Ekstrand et al., "Collaborative Filtering Recommender Systems," Foundations and Trends in Human-Computer Interaction, Feb. 2011, pp. 81-173, vol. 4, No. 2.

B. Sarwar et al., "Item-Based Collaborative Filtering Recommendation Algorithms," Proceedings of the 10th International Conference on World Wide Web (WWW), May 1-5, 2001, pp. 285-295.

U.S. Appl. No. 16/229,075 filed in the name of Sashka T. Davis et al. filed Dec. 21, 2018 and entitled "Automated Determination of Relative Asset Importance in an Enterprise System."

U.S. Appl. No. 16/399,199 filed in the name of Sashka T. Davis et al. filed Apr. 30, 2019 and entitled "Prioritization of Remediation Actions for Addressing Vulnerabilities in an Enterprise System."

* cited by examiner

600

Initialize k training dates $D \leftarrow \{d_{-1}, d_{-2}, ..., d_{-k}\}$
Initialize test date, $d \leftarrow d_0$
Initialize n recommender systems, $R \leftarrow \{R_1, R_2, ..., R_n\}$
Initialize machine learning model, $M$
Initialize train feature matrix, $X^T$
Initialize ground truth, $y^T$
foreach $d_i \in D$:
    $I_f \leftarrow \{\}$
    foreach $a_j \in A$
        $I' \leftarrow i_k \in I$ st $a_j \in$
        $i_k D' \leftarrow d_k \in D$ st $d_k \in i_k, i_k \in I'$
        $I_f \leftarrow I_f \cup \{i_k \in I$ st $d_k \leq d_i, d_k = \max(D')\}$
    Initialize observation matrix, $O$
    foreach $R_j \in R$:
        $x_i^T \leftarrow x_i^T \cup R_i(O), x_i^T \in X^T$
$M.train(X^T, y^T)$

FIG. 6A

Initialize test feature matrix, $X$
$I_f \leftarrow \{\}$
foreach $a_t \in A$
    $I' \leftarrow i_k \in I$ st $a_t \in E$
    $i_k D' \leftarrow d_k \in D$ st $d_k \in i_k, i_k \in I'$
    $I_f \leftarrow I_f \cup \{i_k \in I$ st $d_k \leq d, d_k = \max(D')\}$
Initialize observation matrix, $O$
foreach $R_f \in \mathbf{R}$:
    $x_t \leftarrow x_t \cup R_t(O)$
$\hat{y} \leftarrow M.predict(X)$
$p \leftarrow threshold(\hat{y}, t)$
return $p, \hat{y}$

PREDICTING VULNERABILITIES AFFECTING ASSETS OF AN ENTERPRISE SYSTEM

FIELD

The field relates generally to information security, and more particularly to detection of security threats in enterprise systems.

BACKGROUND

Various entities are subject to different types of security threats. Some security threats relate to networking and computer security for an enterprise system. Security threats include, for example, vulnerabilities in assets of the enterprise system, which present risks that can expose the enterprise and its users or devices. As the number of assets in an enterprise system grows, the number of vulnerabilities may increase. The task of monitoring and remediating such vulnerabilities and other security threats thus presents various challenges.

SUMMARY

Illustrative embodiments of the present invention provide techniques for predicting vulnerabilities affecting assets of an enterprise system. Embodiments advantageously improve the security of enterprise systems through the prediction of vulnerabilities affecting assets that were offline, unavailable or otherwise not scanned for vulnerabilities.

In one embodiment, a method comprises obtaining vulnerability scan results for a first subset of a plurality of assets of an enterprise system and populating an observation data structure, based at least in part on the obtained vulnerability scan results, indicating which of a plurality of vulnerabilities are observed on respective ones of the plurality of assets of the enterprise system. The method also comprises determining a set of recommendations for missing entries of the observation data structure for a second subset of the plurality of assets of the enterprise system utilizing at least one recommender system comprising at least one similarity function for determining similarity between a first set of vulnerabilities observed on one or more of the first subset of the plurality of assets and a second set of vulnerabilities observed on one or more of the second subset of the plurality of assets. The method further comprises predicting one or more vulnerabilities affecting one or more of the assets in the second subset of the plurality of assets utilizing a machine learning model and the determined set of recommendations, and applying one or more remediation actions for remediating at least a given one of the predicted vulnerabilities affecting at least a given one of the one or more assets in the second subset of the plurality of assets. The method is performed by at least one processing device comprising a processor coupled to a memory.

The processing device may be implemented, for example, in one or more network devices in a computer network, in a security operations center of an enterprise, or in a security analytics system or other type of network security system associated with the computer network or an enterprise.

These and other illustrative embodiments include, without limitation, methods, apparatus, networks, systems and processor-readable storage media.

BRIEF DESCRIPTION OF THE DRAWINGS

FIGS. 6A and 6B show pseudocode for training and utilizing a machine learning model to predict vulnerabilities affecting assets of an enterprise system in an illustrative embodiment.

DETAILED DESCRIPTION

Figure 1:
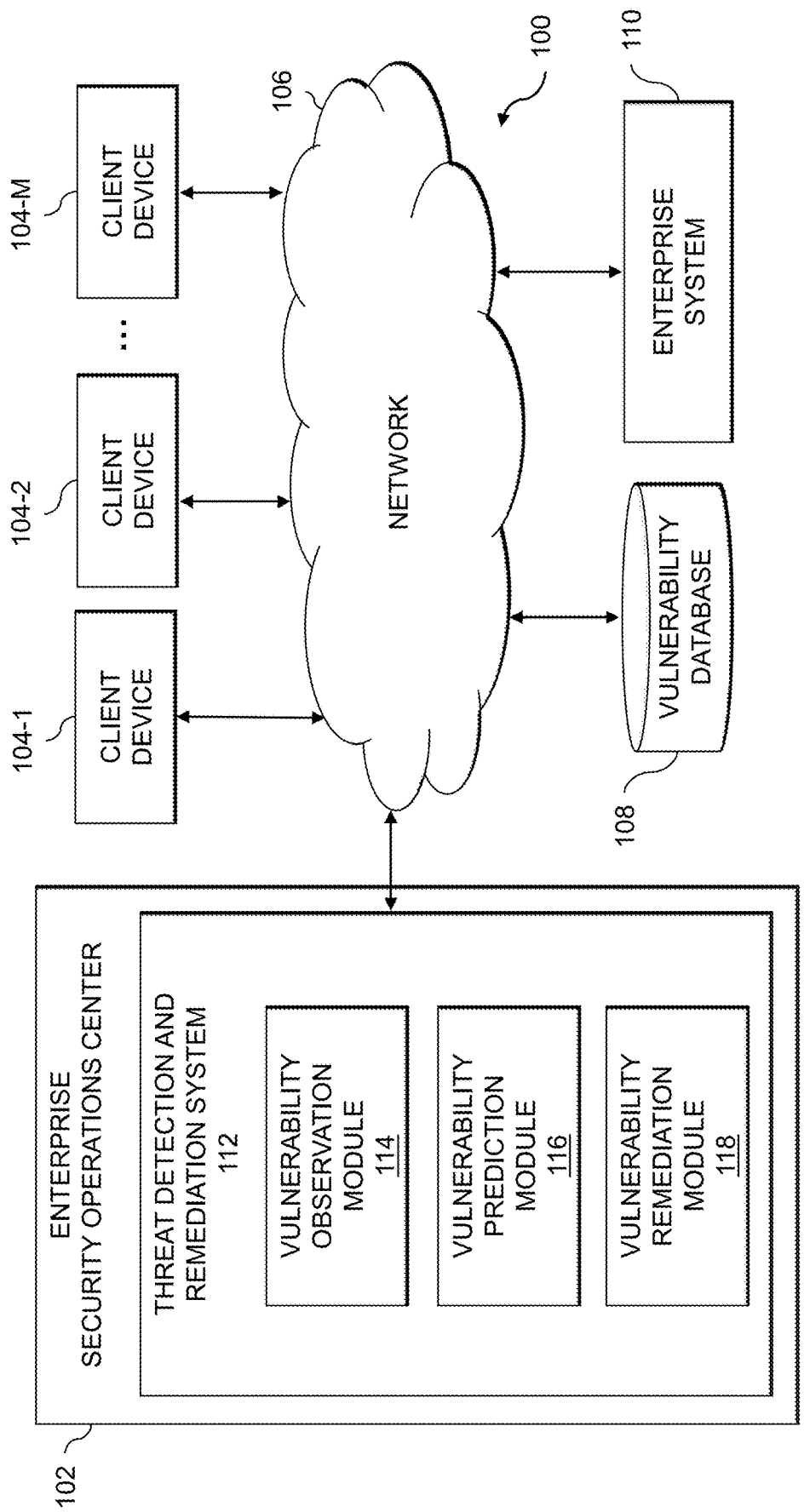
FIG. 1 is a block diagram of an information processing system for predicting vulnerabilities affecting assets of an enterprise system in an illustrative embodiment of the invention.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

As the number of assets in an enterprise system grows, it is increasingly difficult to monitor and remediate vulnerabilities in such assets. For example, an enterprise network or system may include a large number of assets (e.g., physical and virtual computing resources) that run a variety of operating systems and have different configurations and technologies. As a result, vulnerability management programs for enterprise systems may have various gaps. For example, vulnerability scans may be scheduled infrequently, and vulnerability scanners can miss assets if they are not available at the time of a scan. Vulnerability scans may also be costly (e.g., in terms of time required to complete, resources consumed, etc.) and thus some assets may be skipped during a vulnerability scan to reduce the cost of the vulnerability scan. These and other challenges introduce risk by limiting the visibility of a current state of vulnerabilities in an enterprise system. An enterprise cannot properly address risk that it does not see, and thus the enterprise system may be exposed.

Illustrative embodiments provide techniques for predicting vulnerabilities affecting assets that have "outdated" scans. An asset with an outdated scan, as will be described in further detail below, may include an asset that was not scanned during one or more recent vulnerability scans. In some embodiments, an asset with an outdated scan was not available (e.g., offline) during one or more recent vulnerability scans. In other embodiments, an asset with an outdated scan was purposefully skipped during the one or more recent vulnerability scans (e.g., to reduce the time and computational burden of vulnerability scanning). Advantageously, this provides greater visibility into the risk of an enterprise system due to predicting vulnerabilities on assets with outdated scans that up-to-date scans would catch. In some embodiments, vulnerability scan results are utilized from one or more scanning tools to compute an estimate of the probability that a particular known vulnerability occurs on a particular asset. The vulnerability scan results or data may be converted into an observation data structure (e.g., an observation matrix) that is fed into a set of recommender systems to produce a set of features. The features are converted into predictions with corresponding confidence scores using one or more machine learning models.

FIG. 1 shows an information processing system 100 configured in accordance with an illustrative embodiment. The information processing system 100 is assumed to be built on at least one processing platform and provides functionality for predicting vulnerabilities affecting assets of an enterprise system 110. The assets may include, by way of example, physical and virtual computing resources in the enterprise system 110. Physical computing resources may include physical hardware such as servers, storage systems, networking equipment, Internet of Things (IoT) devices, other types of processing and computing devices, etc. Virtual computing resources may include virtual machines (VMs), containers, etc.

In this embodiment, the system 100 more particularly comprises an enterprise security operations center (SOC) 102 and a plurality of client devices 104-1, 104-2, . . . 104-M (collectively, client devices 104). The client devices 104 are coupled to a network 106. Also coupled to the network 106 is a vulnerability database 108, which may store various information relating to vulnerabilities as will be described in further detail below.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The vulnerability database 108, as discussed above, is configured to store and record information relating to vulnerabilities and assets affected by vulnerabilities in the enterprise system 110. Such information may include Vulnerability and Risk Management (VRM) assessment data for assets and vulnerabilities in the enterprise system 110, vulnerability scan results, observation matrices, feature sets, vulnerability predictions, etc.

The vulnerability database 108 in some embodiments is implemented using one or more storage systems or devices associated with the enterprise SOC 102. In some embodiments, one or more of the storage systems utilized to implement the vulnerability database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

The client devices 104 are configured to access or otherwise utilize an enterprise system 110. The enterprise system 110 may represent an information technology (IT) infrastructure comprising a plurality of assets (e.g., physical or virtual computing resources) of a business, entity or other enterprise.

In the present embodiment, alerts or notifications generated by a threat detection and remediation system 112 of the enterprise SOC 102 are provided over network 106 to client devices 104, or to a system administrator, IT manager, or other authorized personnel via one or more host agents. Such host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the threat detection and remediation system 112. For example, a given host agent may comprise a mobile telephone equipped with a mobile application configured to receive alerts from the enterprise SOC 102 or the threat detection and remediation system 112 and to provide an interface for the host agent to select particular remediation measures for responding to the alert or notification. Examples of such remediation measures may include blocking access by one or more of the client devices 104 to assets of the enterprise system 110, requiring user input or authentication by the client devices 104 to obtain information from or otherwise utilize one or assets of the enterprise system 110, triggering further review of the enterprise system 110 or assets thereof, etc. Remediation measures may also include applying security hardening procedures to assets of the enterprise system 110, establishing new or modified monitoring of assets of the enterprise system 110, changing or adjusting the configuration of assets of the enterprise system 110, etc.

It should be noted that a "host agent" as this term is generally used herein may comprise an automated entity, such as a software entity running on a processing device. Accordingly, a host agent need not be a human entity.

As shown in FIG. 1, the enterprise SOC 102 comprises threat detection and remediation system 112. As will be described in further detail below, the threat detection and remediation system 112 is configured to predict vulnerabilities affecting assets of the enterprise system 110, and to apply remedial action to address such predicted vulnerabilities.

Although shown as an element of the enterprise SOC 102 in this embodiment, the threat detection and remediation system 112 in other embodiments can be implemented at least in part externally to the enterprise SOC 102, for example, as a stand-alone server, set of servers or other type of system coupled to the network 106. In some embodiments, the threat detection and remediation system 112 may be implemented at least in part within one or more of the client devices 104.

The threat detection and remediation system 112 in the FIG. 1 embodiment is assumed to be implemented using at least one processing device. Each such processing device generally comprises at least one processor and an associated memory, and implements one or more functional modules for controlling certain features of the threat detection and remediation system 112. In the FIG. 1 embodiment, the threat detection and remediation system 112 comprises a vulnerability observation module 114, a vulnerability prediction module 116, and a vulnerability remediation module 118.

The vulnerability observation module 114 is configured to obtain vulnerability scan results for a first subset of assets of the enterprise system 110. The first subset may include assets that are online or otherwise available during one or more recent vulnerability scans. The vulnerability observation module 114 is also configured to utilize the obtained vulnerability scan results to populate an observation data structure (e.g., an observation matrix or array) indicating which of a plurality of vulnerabilities are observed on respective ones of the plurality of assets of the enterprise system 110.

The vulnerability prediction module 116 is configured to determine a set of recommendations for missing entries of the observation data structure for a second subset of the plurality of assets of the enterprise system utilizing at least one recommender system. The at least one recommender system comprises at least one similarity function for determining similarity between a first set of vulnerabilities observed on one or more of the first subset of the plurality of assets and a second set of vulnerabilities observed on one or more of the second subset of the plurality of assets. The vulnerability prediction module 116 is also configured to predict one or more vulnerabilities affecting one or more of the assets in the second subset of the plurality of assets utilizing a machine learning model and the determined set of recommendations.

The vulnerability remediation module 118 is configured to apply one or more remediation actions for remediating at least a given one of the predicted vulnerabilities affecting at least a given one of the one or more assets in the second subset of the plurality of assets. In some embodiments, the vulnerability remediation module 118 is configured to determine an order in which to apply a set of remediation actions in the enterprise system 110 to address at least one of the predicted vulnerabilities. This may be done based at least in part on asset importance, vulnerability criticality or severity, confidence in the vulnerability predictions, etc.

It is to be appreciated that the particular arrangement of the enterprise SOC 102, the threat detection and remediation system 112, the vulnerability observation module 114, the vulnerability prediction module 116, and the vulnerability remediation module 118 illustrated in the FIG. 1 embodiment is presented by way of example only, and alternative arrangements can be used in other embodiments. As discussed above, for example, the enterprise SOC 102, the threat detection and remediation system 112, the vulnerability observation module 114, the vulnerability prediction module 116, and the vulnerability remediation module 118 may in some embodiments be implemented internal to one or more of the client devices 104. As another example, the functionality associated with the vulnerability observation module 114, the vulnerability prediction module 116, and the vulnerability remediation module 118 may be combined into one module, or separated across more than three modules with the multiple modules possibly being implemented with multiple distinct processors or processing devices.

At least portions of the vulnerability observation module 114, the vulnerability prediction module 116, and the vulnerability remediation module 118 may be implemented at least in part in the form of software that is stored in memory and executed by a processor.

It is to be understood that the particular set of elements shown in FIG. 1 for predicting vulnerabilities affecting assets of the enterprise system 110 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 112 may be implemented external to enterprise SOC 102, such that the enterprise SOC 102 can be eliminated.

In some embodiments, the threat detection and remediation system 112 may be part of or otherwise associated with a system other than the enterprise SOC 102, such as, for example, a critical incident response center (CIRC), a security analytics system, a security information and event management (SIEM) system, a Governance, Risk and Compliance (GRC) system, etc.

The threat detection and remediation system 112 and other portions of the system 100, as will be described in further detail below, may be part of cloud infrastructure as will be described in further detail below. The cloud infrastructure hosting the threat detection and remediation system 112 may also host any combination of the enterprise SOC 102, one or more of the client devices 104, the vulnerability database 108 and the enterprise system 110.

The threat detection and remediation system 112 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 104 and threat detection and remediation system 112 or components thereof (e.g., the vulnerability observation module 114, the vulnerability prediction module 116, and the vulnerability remediation module 118) may be implemented on respective distinct processing platforms, although numerous other arrangements are possible. For example, in some embodiments at least portions of the threat detection and remediation system 112 and one or more of the client devices 104 are implemented on the same processing platform. A given client device (e.g., 104-1) can therefore be implemented at least in part within at least one processing platform that implements at least a portion of the threat detection and remediation system 112.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 104, threat detection and remediation system 112 or portions or components thereof, to reside in different data centers. Numerous other distributed implementations are possible. The threat detection and remediation system 112 can also be implemented in a distributed manner across multiple data centers.

Additional examples of processing platforms utilized to implement threat detection and remediation system 112 in illustrative embodiments will be described in more detail below in conjunction with FIGS. 7 and 8.

It is to be appreciated that these and other features of illustrative embodiments are presented by way of example only, and should not be construed as limiting in any way.

An exemplary process for predicting vulnerabilities affecting assets of an enterprise system will now be described in more detail with reference to the flow diagram of FIG. 2. It is to be understood that this particular process is only an example, and that additional or alternative processes for predicting vulnerabilities affecting assets of an enterprise system can be carried out in other embodiments.

In this embodiment, the process includes steps 200 through 208. These steps are assumed to be performed by the threat detection and remediation system 112 utilizing the vulnerability observation module 114, the vulnerability prediction module 116, and the vulnerability remediation module 118. The process begins with step 200, obtaining vulnerability scan results for a first subset of a plurality of assets of an enterprise system.

In some embodiments, step 200 includes identifying two or more clusters of the plurality of assets, where a given cluster comprises two or more of the plurality of assets exhibiting at least a threshold level of similarity to one another, selecting at least one asset in each of the two or more clusters for inclusion in the first subset of the plurality of assets, and performing vulnerability scanning for the first subset of the plurality of assets. Selecting at least one asset from the given cluster for inclusion in the first subset of the plurality of assets may be based at least in part on relative asset criticalities of the two or more assets in the given cluster.

Figure 2:
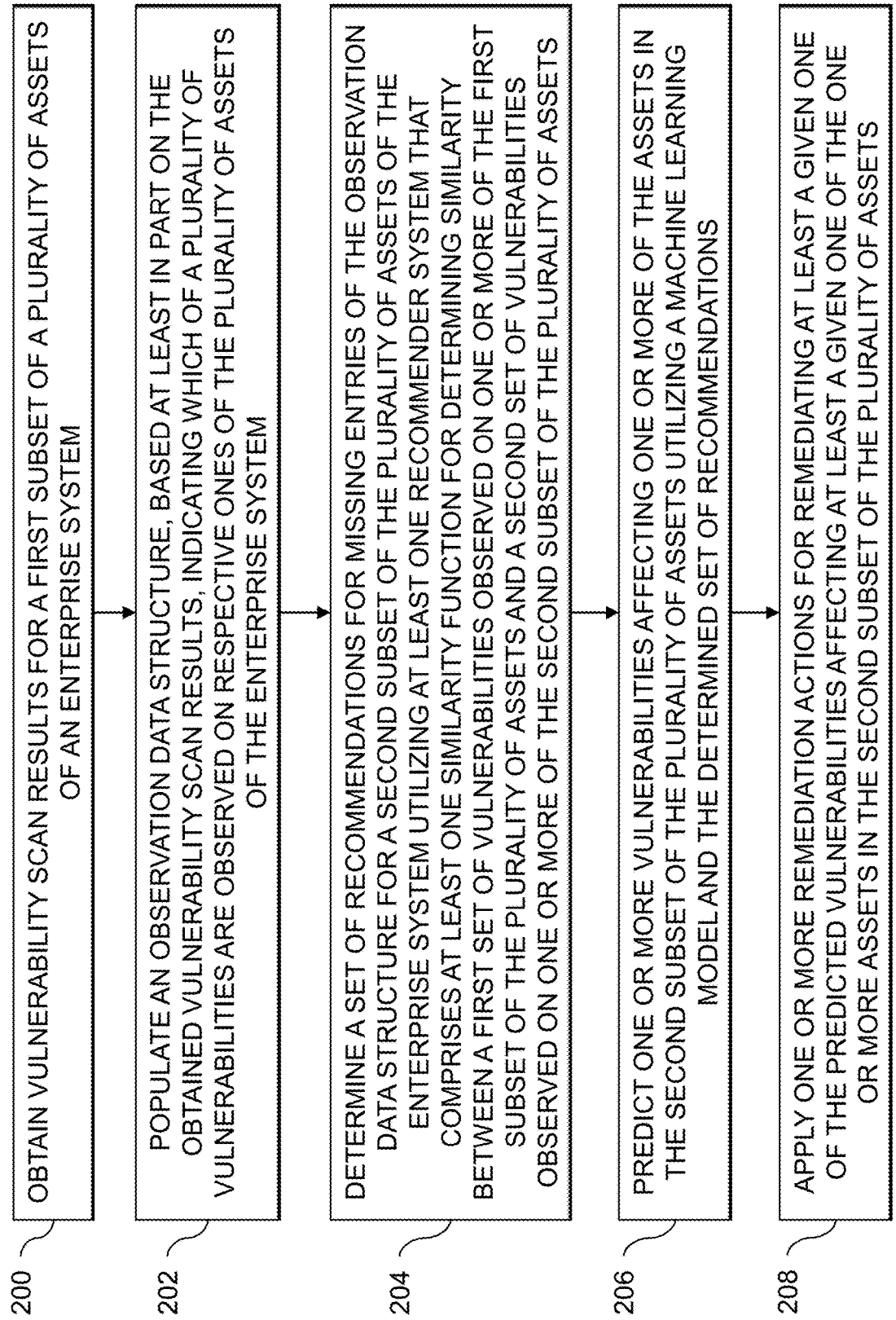
FIG. 2 is a flow diagram of an exemplary process for predicting vulnerabilities affecting assets of an enterprise system in an illustrative embodiment.

The FIG. 2 process continues with step 202, populating an observation data structure based at least in part on the vulnerability scan results obtained in step 200. The observation data structure, which may be in the form of an observation matrix, indicates which of a plurality of vulnerabilities are observed on respective ones of the plurality of assets of the enterprise system. The vulnerability scan results obtained in step 200 may comprise results obtained from two or more different vulnerability scanning tools, and step 202 may comprise converting vulnerability identifiers from each of the two or more different vulnerability scanning tools into a common taxonomy. In some embodiments, the plurality of assets of the enterprise system are associated with respective unique asset identifiers, the plurality of vulnerabilities are associated with respective unique vulnerability identifiers, and the obtained vulnerability scan result entries each have one of the unique asset identifiers, one of the unique vulnerability identifiers, and a scan date identifier. Step 202 in such embodiments may include populating entries in the observation matrix for scan results with a scan date identifier within a designated threshold of a current time, each entry in the observation matrix indicating whether a given one of the unique vulnerability identifiers is observed on a given one of the unique asset identifiers.

In step 204, a set of recommendations for missing entries of the observation data structure for a second subset of the plurality of assets of the enterprise system are determined utilizing at least one recommender system. The at least one recommender system comprises at least one similarity function for determining similarity between a first set of vulnerabilities observed on one or more of the first subset of the plurality of assets and a second set of vulnerabilities observed on one or more of the second subset of the plurality of assets. The second subset of the plurality of assets may comprise assets missing from the vulnerability scan results obtained in step 200, or assets whose associated vulnerability data in the vulnerability scan results obtained in step 200 is more than a designated threshold amount of time prior to a current time.

Step 204 in some embodiments utilizes two or more recommender systems, where each of the two or more recommender systems having an associated recommender model type and an associated hyperparameter configuration. The two or more recommender systems may have at least one of: two or more different associated recommender model types, the two or more different recommender model types comprising at least two of: a collaborative filter recommender model, a Slope-One recommender model, and a matrix factorization recommender model; and two or more different associated hyperparameter configurations. The recommender system or systems utilized in step 204 may utilize one or more of the following hyperparameters: a first hyperparameter specifying a first threshold number of similar assets to use for making a recommendation; a second hyperparameter specifying that recommendations are to be made only for ones of the plurality of vulnerabilities observed on at least a second threshold number of the plurality of assets; a third hyperparameter specifying that recommendations are to be made only for ones of the plurality of assets that have a least a third threshold number of the plurality of vulnerabilities; a fourth hyperparameter specifying that recommendations are limited to neighbor assets that have at least a fourth threshold number of the plurality of vulnerabilities in common with one another; and a fifth hyperparameter specifying that recommendations are limited to pairs of the plurality of assets that have a similarity score exceeding a fifth threshold number.

The FIG. 2 process continues with step 206, predicting one or more vulnerabilities affecting one or more of the assets in the second subset of the plurality of assets utilizing a machine learning model and the determined set of recommendations. The machine learning model may comprise a nonlinear classifier such as a random forest classifier, a neural network, etc. Where two or more different recommender systems are utilized in step 204, the machine learning model may apply weights to recommendations for missing values provided by each of the two or more different recommender systems based at least in part on one or more of dimensions of the observation matrix and a density of the observation matrix.

In step 208, one or more remediation actions are applied for remediating at least a given one of the predicted vulnerabilities affecting at least a given one of the one or more assets in the second subset of the plurality of assets. The one or more remediation actions for remediating the given vulnerability comprise applying one or more security hardening measures to the given asset. The security hardening measures may include adding additional authentication mechanisms for accessing the given asset, placing the given asset behind a firewall in the enterprise system, applying the patch to the given asset to remove the given vulnerability. In some embodiments, security hardening measures are applied to other assets that are connected to or otherwise communicate with assets having predicted vulnerabilities, as such connection or communication in some cases may expose such other assets to the predicted vulnerabilities.

Vulnerability management is a challenging problem. The volume of vulnerability scan results may in some cases overwhelm an organization or other enterprise as the number of assets being monitored for vulnerabilities grows. A large enterprise may control many assets. To maintain full visibility of the vulnerability risk within the enterprise, vulnerability scanning should occur at or near real-time. As the size of the network or enterprise system increases, so does the total scan time. This makes it difficult for large enterprises to maintain up-to-date scans for the entire network or enterprise system.

Depending on the volume of assets and attitudes toward security, enterprises may not maintain up-to-date scans. Regulations and industry standards place a lower bound on the frequency of vulnerability scanning, but it is often infrequent. For example, the Payment Card Industry (PCI) Data Security Standard (DSS) 3.0 only requires quarterly scans. Such infrequent scanning introduces risk. An enterprise that performs vulnerability scans infrequently can have a lack of visibility into their vulnerability risk. For example, an enterprise that scans its entire network or enterprise system every 90 days introduces a timespan of up to 90 days before a known vulnerability may be detected. This provides an additional time window for bad actors to exploit existing or known vulnerabilities.

Illustrative embodiments provide solutions that can reduce the mean time-to-detect (MTTD) by predicting the existence of known vulnerabilities on devices whose scans are not up-to-date. In some embodiments, the solution leverages the latest available scan results to infer which of those recently scanned vulnerabilities might occur on assets that were not included in the latest scan.

Predictive capabilities may be utilized within a vulnerability management domain for two main purposes: improvement of vulnerability prioritization and the discovery of previously unknown vulnerabilities.

Today, enterprises often rely on infrequent vulnerability scans for assets under their control. As a result, vulnerability prioritization and remediation decisions are made without full knowledge of the environment. This leads to inefficiencies in vulnerability management due to miscalculation of risk and inefficiencies in remediation efforts.

These miscalculations of risk occur when the scan results being evaluated differ significantly from ground truth. This gap can exist for many reasons as described herein (e.g., assets being offline or otherwise unavailable during one or more recent vulnerability scans, assets being skipped during one or more recent vulnerability scans, etc.). The techniques described herein for predicting vulnerabilities on assets with outdated scans help to reduce this gap in cases where scanning is infrequent or incomplete, which leads to inaccurate scan information as it relates to specific assets. This difference between what is known and what is true may adversely influence an organization's decisions for prioritization and remediation of vulnerabilities.

An infrequent scanning schedule will introduce inefficiencies in remediation efforts. The full set of vulnerabilities will contain at least as many instances of a given vulnerability $v_i$ as compared with the set of known vulnerabilities. Suppose a decision is made to remediate vulnerability $v_i$ across the enterprise due to its high perceived risk. Further suppose that n instances of $v_i$ exist in the network or enterprise system, but that only k instances of $v_i$ have been found so far by the vulnerability scanners. In this case, k instances of $v_i$ will be remediated, leaving n−k instances of $v_i$ remaining on assets of the enterprise network or system. Not only does this continue to expose the enterprise to risk of exploit due to the presence of $v_i$, the enterprise system (e.g., analysts thereof) will need to perform remediation efforts again. In the worst case, if each of the n−k remaining instances of $v_i$ is scanned on a different day, remediation efforts could be performed for a total of n−k additional iterations.

Moreover, incomplete information, whether due to infrequent scanning or incomplete scanning, can also impact vulnerability prioritization. If a high severity vulnerability is not discovered, remediation efforts will focus on identified vulnerabilities with potentially lower relative severity, potentially leaving exposed the more severe vulnerability. Predictions can at a minimum identify assets that may contain a vulnerability, which can be validated with a focused scan.

The techniques described herein can reduce the miscalculation of risk and improve the described remediation inefficiencies through the introduction of predictions of vulnerabilities on assets with outdated scans (e.g., determining or predicting which vulnerabilities are "missing" on such assets from a set of known vulnerabilities).

In some embodiments, various data assumptions are made. The vulnerability scan results used as input data, for example, may be assumed to include a unique asset identifier, a unique vulnerability identifier, and a scan date. These limited assumptions allow the techniques described herein to work with minimal privacy concerns as the unique identifiers can be anonymized and no other specific data are required for the solution to work.

Figure 3:
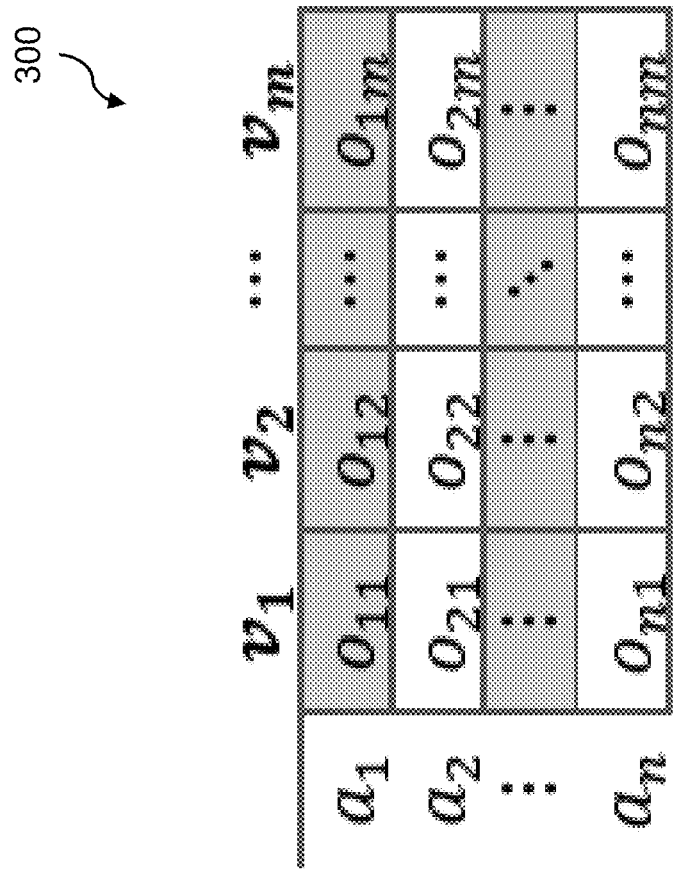
FIG. 3 shows an observation matrix in an illustrative embodiment.

Asset identifiers and vulnerability identifiers are used to construct a matrix of observations that describes the current state of the environment. Let A be the set of unique asset identifiers, let V be the set of unique vulnerability identifiers, and let D be the scan dates associated with the scan result entries. Let I be the input data. Each $i_k \in I$ is a 3-tuple <a, v, d>, where a∈A, v∈V, d∈D. Let O be the observation matrix, where $o_{ij} \in \{0,1\}$. For a unique asset identifier $a_i$ and a unique vulnerability identifier $v_j$, $o_{ij}=1$ if $v_j$ has been observed on $a_i$ and is 0 otherwise. FIG. 3 shows an example 300 of the observation matrix O.

Vulnerability scan result data is inherently time dependent. The state of the environment changes as new scans are added or vulnerabilities are remediated. Due to this fact, the observation matrix O is time dependent. To ensure that the observation matrix O is consistent with the current state of the environment, in some embodiments only vulnerabilities from an asset's most recent scan (or most recent y scans) are utilized in the construction of the observation matrix O.

In some embodiments, it is important that unique vulnerability identifiers and unique asset identifiers have a common taxonomy. Scanning tools may combine multiple vulnerabilities into a single identifier. For example, one scan identifier may search for three Common Vulnerabilities and Exposures (CVE) identifiers (IDs) and two Bugtraq IDs. In an environment with multiple scanning tools, the unique vulnerability identifiers V should contain identifiers that are common between the scanning tools.

Suppose the network utilizes k scanning tools $s_1, s_2, \ldots, s_k$ and that vulnerability identifiers are not converted to a common taxonomy. In such a case, a scanning tool $s_i$'s unique identifiers $V_{s_i} \subseteq V$ will likely be independent of another scanning tool $s_j$'s unique identifiers $V_{s_j} \subseteq V$. This will result in multiple linearly independent matrices combined into one observation matrix O, which will affect performance.

In some embodiments, if $V_{s_1}, V_{s_2}, \ldots, V_{s_k}$ cannot be or are not converted into a common taxonomy, then each scanner is treated as a separate data source. Each data source will be converted to an observation matrix $O_{s_1}, O_{s_2}, \ldots, O_{s_k}$. The solution described herein can then be run on each scanner's data independently, resulting in up to k distinct result sets.

Figure 4:
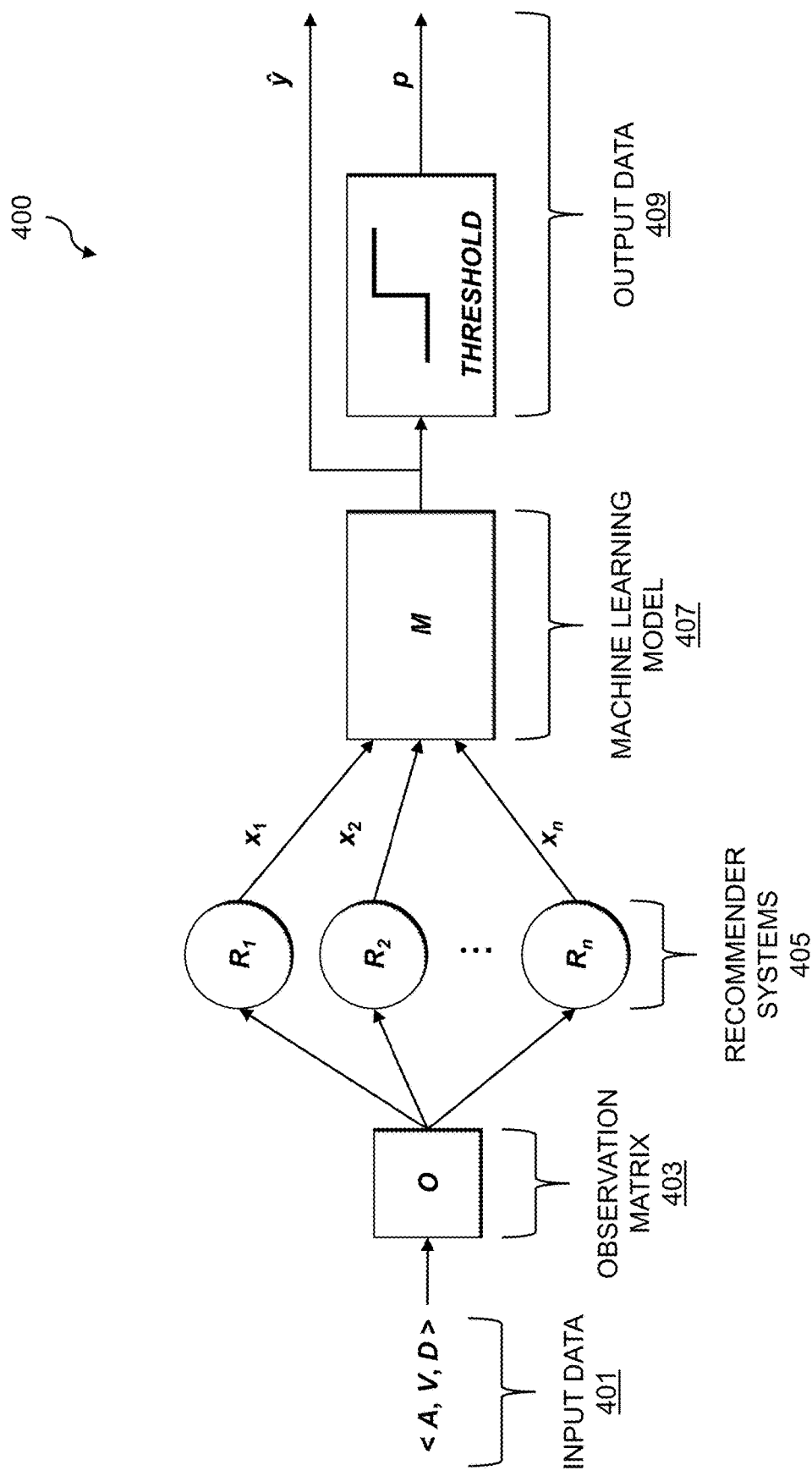
FIG. 4 shows a system architecture for predicting vulnerabilities affecting assets of an enterprise system in an illustrative embodiment.

FIG. 4 shows a system architecture 400 of a solution for predicting vulnerabilities affecting assets of an enterprise system with outdated vulnerability scans. The system architecture 400 receives as input data 401 a set of k scan result entries, where each scan result entry is a 3-tuple of <a, v, d>, where a∈A, v∈V, d∈D. For each $a_i$∈A, let I'⊆I be the set of scan results that contain $a_i$. Let D'⊆D be the set of dates that exist in I'. A scan result will be kept so long as d=max(D') for d∈$i_k$,$i_k$∈I'. In other words, only the most recent scan results will be kept for each asset $a_i$.

The filtered subset of scan result entries will be used to create observation matrix O 403. The observation matrix O 403 will be input to each of n recommender systems 405, denoted as $R_1, R_2, \ldots, R_n$. Let R be the set of n recommender systems 405. Each recommender system $R_i$∈R is defined by the type of recommender model $f_i$ and its hyperparameter configuration $H_i$. $R_i$ takes O as input and produces recommendations for each $o_{ij}$∈O. The set of predictions from R is defined as X where $x_i$=$R_i$(O), $x_i$∈X, $R_i$∈R.

X is the set of input features for a machine learning model M 407. M outputs ŷ∈[0,1] according to ŷ=M(X) where $ŷ_{ij}$ is the probability that $o_{ij}$=1. A threshold function is utilized to convert ŷ to predictions p∈{0,1} using a threshold value t∈[0,1] according to:

$$p_{ij} = \begin{cases} 1 & \text{if } ŷ > t \\ 0 & \text{if } ŷ \leq t \end{cases}$$

The system architecture 400 provides as output data 409 <ŷ, p>, where p represents the predictions, and ŷ can be interpreted as a confidence in the predictions. Predictions can be sorted by ŷ in descending order, resulting in the most confident predictions at the top of the list. This allows for prioritization of remediation actions for the predicted vulnerabilities.

Recommender systems may be used in various Internet technologies, such as in e-commerce shopping recommendations, movie recommendations, connection recommendations for social networking sites, etc. In each of these cases, recommendations are provided based on similarity, which intuitively makes sense. Humans regularly rely on recommendations from their network. For example, a person interested in seeing a movie might ask friends for recommendations on which movies are good. That person would rely more heavily on a friend's recommendation if that friend has similar tastes. Likewise, recommender systems weight contributions proportionate to the similarity between users or items, depending on the type of recommender system.

In some embodiments, recommender systems 405 are utilized as similar assets tend to share the same vulnerabilities. Similar assets might have the same OS or the same applications, which means they would be susceptible to the same vulnerabilities. Rather than relying on the technology profile of the assets, however, the similarity of assets can be inferred from their similarity in vulnerability scan results. These calculated similarities are then used to "recommend" missing vulnerability scan results.

In some embodiments, the system architecture 400 leverages several different types of recommender systems for use as the recommender systems 405, including but not limited to collaborative filters, Slope-One, and matrix factorization type recommender systems. A standard recommender system requires a set of users U, a set of items I and a set of ratings R, where $r_{ij}$ is user $u_i$'s rating for item $i_j$. Each of the recommender systems 405 may rely on a similarity function, Sim(a, b), which calculates the similarity between a and b. A variety of similarity functions may be used, including Pearson correlation and cosine similarity.

Consider a recommender system that utilizes a user-user collaborative filter. The equation for this type of recommender system is:

$$\hat{r}_{u,i} = \bar{r}_u + \frac{\sum_{u' \in U} \text{Sim}(u, u')(r_{u',i} - \bar{r}_{u'})}{\sum_{u' \in U} |\text{Sim}(u, u')|}$$

where $\hat{r}_{u,i}$ is the predicted recommendation of item i∈I for user u∈U, and $\bar{r}_u$ is the mean rating for user u.

To adapt this type of recommender system for use in system architecture 400, some modifications are used. Assets are considered analogous to users, and vulnerabilities are considered analogous to items. Let A={$a_1, a_2, \ldots, a_n$} be the set of assets, let V={$v_1, v_2, \ldots, v_m$} be the set of vulnerabilities, and let O be an n×m matrix, where $o_{ij}$∈{0, 1}. $o_{ij}$=1 if $v_j$ was observed on $a_i$. Otherwise, $o_{ij}$=0. The observation matrix O will tend to be sparse, and the size and composition of O will depend on the environment.

Because the ratings in this problem are unary, the mean centering in the collaborative filter is not necessary. An alternative for generating predictions is to calculate the weighted sum:

$$\hat{o}_{av} = \frac{\sum_{a' \in A} \text{Sim}(a, a_i) \times o_{a',v}}{\sum_{a' \in A} |\text{Sim}(a, a_i)|}$$

The weighted sum sets $\hat{o}_{av} \in [0,1]$ equal to the proportion of assets containing v weighted by their similarity. This particular modification has some disadvantages. As such, certain hyperparameters are used to improve performance in some embodiments. To better illustrate the disadvantages, let us predict $\hat{o}_{ij}$ for an example $a_i \in A$, $v_j \in V$ and O. Suppose that there is an asset $a_k$ with $s_{ik}=1.0$ where $o_{kj}=0$, but there are 20 assets with 0.2 similarity that do have the vulnerability. The prediction would be as follows:

$$\hat{o}_{ij} = \frac{1.0 \times 0 + 20 \times (0.2 \times 1)}{|1.0 + 20 \times 0.2|} = \frac{4}{5} = 0.8$$

Even though the most similar asset does not have $v_j$, the collaborative filter would still predict $v_j$ on $a_i$ due to the volume of dissimilar assets containing $v_j$. This is problematic, and in many cases, the prediction will be incorrect.

Alternatively, asset vectors can be converted to unit vectors, and $\hat{o}_{ij}$ can be calculated according to:

$$\hat{o}_{ij} = \sum_{a' \in A} \text{Sim}(a, a')$$

$\hat{o}_{ij}$ is bounded so long as the number of neighbors is bounded. This modification decreases the contribution from assets with many vulnerabilities, and thus better captures similarity in the case of unary data. The downside of this approach is that the upper bound of $o_{ij}$ is dependent on the neighborhood size. The ordering of predictions will be preserved, but the results are not as readily explainable.

To address the above-noted problems inherent in either particular method for predictions, some embodiments tune hyperparameters. The following hyperparameters can be tuned for a collaborative filter: top N, by considering the N most similar assets when making a prediction; device count, by predicting only on vulnerabilities that are found on at least k assets; vulnerability count, by predicting only on assets that have at least k vulnerabilities; min support, by only considering neighbor assets that have at least k vulnerabilities in common; and similarity cutoff, by considering only assets that have at least s similarity score. It should be noted that value of "k" may vary for different ones of the above-described tuned hyperparameters.

Other recommender systems may have different hyperparameters. For a given matrix, selecting optimal values of hyperparameters often improves the prediction performance significantly. Unfortunately, the optimal hyperparameters are difficult to identify without knowledge of the completed matrix. From testing, it has been shown that a hyperparameter configuration $H_1$ may work well over certain time intervals, but it can perform very poorly on others. Meanwhile, hyperparameter configuration $H_2$ may have overlapping time intervals where it performs well. This instability appears to be inherent in the performance of a single recommender system. Thus, some embodiments utilize a collection of recommender systems to stabilize the solution.

Consider a single recommender system, $R_1 \in R$. $R_1$ takes as input occurrences O, which is produced via assets A and vulnerabilities V. The output from $R_1$ are the predictions $x_1$. That is, $x_1 = R_1(O)$, $x_1 \in [0,1]$. $x_1$ is known to be unreliable, however the use of multiple recommender systems improves the stability of the solution. Consider recommender systems $R = \{R_1, R_2, \ldots, R_n\}$. Each of them takes as input O, and they produce predictions $x_1, x_2, \ldots, x_n$.

Define $X = \{x_1, x_2, \ldots, x_n\}$ as the input features that will be utilized by a machine learning model M 407. The output of the machine learning model 407 is a rating defined as $\hat{y} = M(X)$, where $\hat{y} \in [0,1]$. $\hat{y}$ can be interpreted as the confidence in the prediction. In some embodiments $\hat{y}$ is converted from [0,1] to {0,1} to increase its usefulness for prediction, such as utilizing a threshold value along with a step function.

An important insight in using multiple recommender systems R 405 as input to the machine learning model M 407 is that a given recommender system $R_i$ defined by recommender type $f_i$ and hyperparameters $H_i$ is reliable only for a subset of matrix compositions, whereas recommender system $R_j$ defined by recommender type $f_j$ and hyperparameters $H_j$ is reliable over a different and potentially overlapping subset of matrix compositions. Therefore, a set of recommender systems R 405 is selected in some embodiments such that the system architecture 400 can perform well as the matrix configuration changes.

As an example, suppose a user-user collaborative filter is used for every $R_i \in R$. Let O be an n×m matrix. Let $h_N \in \mathbb{Z}$ be the size of the neighborhood, let $h_d \in \mathbb{Z}$ be the device count, let $h_v \in \mathbb{Z}$ be the vulnerability count, let $h_m \in \mathbb{Z}$ be the minimum support, and let $h_s \in [0,1]$ be the similarity cutoff. Let $H_i$ be defined as the 5-tuple of $<h_N, h_d, h_v, h_m, h_s>$. A set of 11 recommender systems could be setup as follows:

$R_1$: <n, 1,1,1,0>
$R_2$: <n, 10,1,1,0>
$R_3$: <n, 1,10,1,0>
$R_4$: <10,1,1,1,0>
$R_5$: <20,1,1,1,0>
$R_6$: <n, 1,1,1,0.5>
$R_7$: <n, 20,1,1,0>
$R_8$: <n, 1,20,1,0>
$R_9$: <n, 1,1,1,0.7>
$R_{10}$: <n, 1,1,10,0>
$R_{11}$: <n, 1,1,5,0>

Figure 5:
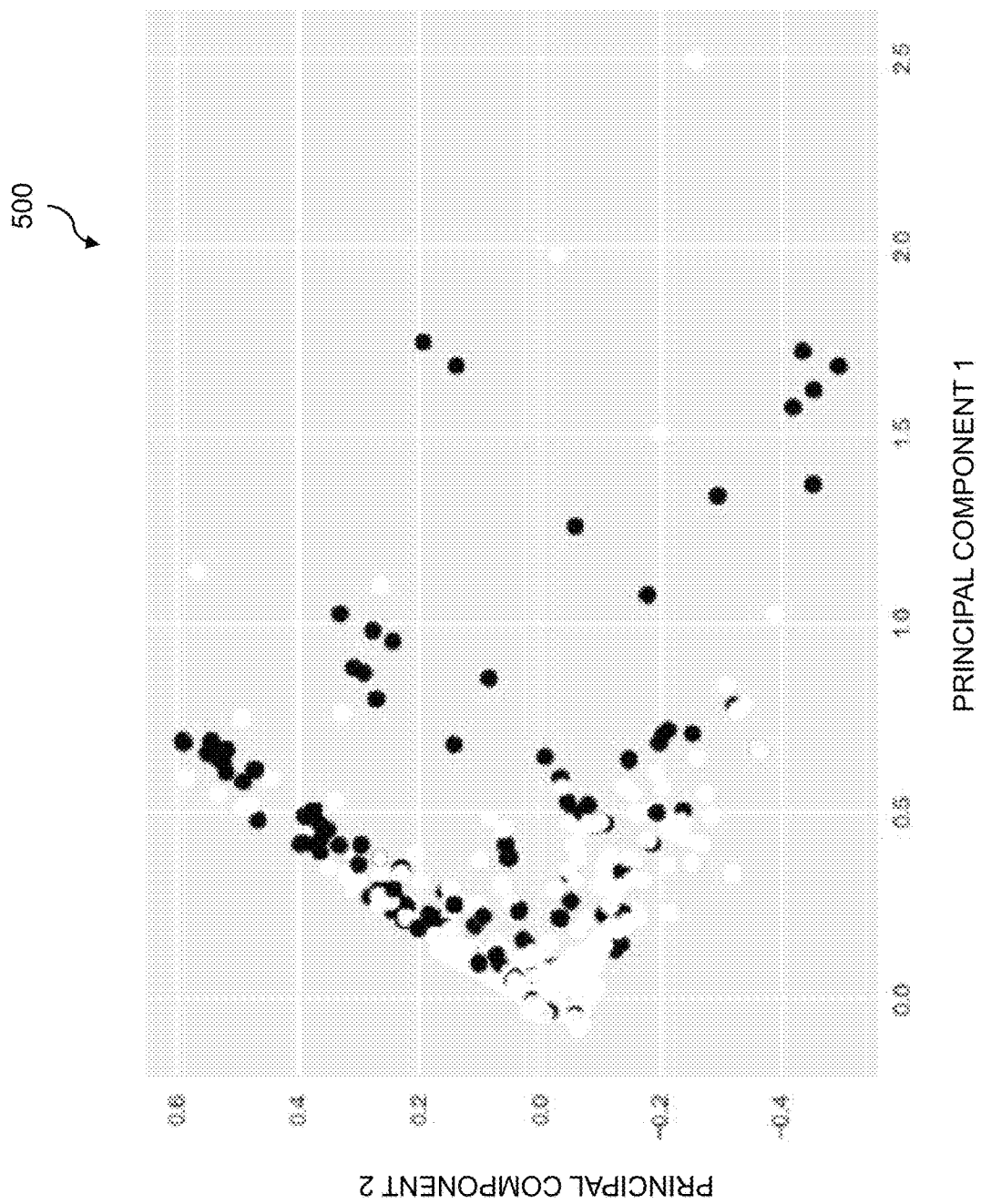
FIG. 5 shows a principal component analysis reduction plot in an illustrative embodiment.

One consideration when choosing which particular machine learning model to utilize is the separability of the data. For example, if the data is not linearly separable, a nonlinear classifier such as a random forest classifier or neural networks should be used. As an illustration of this point, the outputs of 11 collaborative filters were used as features in a random forest classifier. FIG. 5 shows a Principal Component Analysis (PCA) reduction of X plot 500, where white dots represent 1s in O and black dots represent 0s in O. For the purposes of generating plot 500, PCA was used to reduce the 11 input dimensions to the 2 dimensions shown. The plot 500 indicates that the data is not linearly separable.

Historical data is used when training the machine learning model M 407. A training period of n days prior to the current date $d_0$ should be selected. In some embodiments, the range is between 1 and 30 days. For each of the $d_i$ days, each recommender system $R_j \in R$ should be run. The resulting $x_j$ is the concatenation of recommender $R_j$'s output for each day $d_i$. Once these steps have been completed, the machine learning model M 407 is trained on the resulting X. Once the machine learning model M 407 is trained, it may be used to predict on the current data from date $d_0$. FIGS. 6A and 6B illustrate pseudocode 600 and 605, respectively, for training and utilizing the machine learning model M 407.

In some embodiments, compliance can also be checked by scanning assets on the network. Various scanning tools can perform both vulnerability scanning and compliance scanning. As a result, the techniques described above for predicting vulnerabilities on assets with outdated scans may similarly be applied or extended to predicting missing compliance checks on assets that are not up-to-date.

While some embodiments are described above with respect to predicting vulnerabilities on assets that were offline or otherwise unavailable during a recent vulnerability scan, the techniques described herein may also be used to implement "subset" scanning (e.g., where some assets are purposefully skipped to reduce the time and computational burden of scanning an entire enterprise network or system). By utilizing the knowledge that similar assets will have similar scan results, subset scanning could be performed to ease the time and computational burden of scanning the entire enterprise network or system. Assets could be clustered according to similarity. For example, all assets with at least similarity score s between each other could all be grouped in the same cluster. Alternatively, an unsupervised learning algorithm could be utilized to determine a set of clusters.

A subset of assets would be selected from each cluster, and those subsets could be scanned rather than the entire enterprise network or system. The assets in a given cluster could be sampled uniformly such that a predefined percentage of the cluster is selected for scanning, so long as a threshold minimum number of assets are selected from each cluster. Another option is to sample the assets according to the asset criticality or their likelihood of being available for scanning.

Although outputs of recommender systems 405 provide useful features for the machine learning model 407, additional features may be used in some embodiments to improve performance. For example, additional features could draw from the input data, the observation matrix O, or information about the assets or vulnerabilities. Adding features from the observation matrix O, like the dimensions of the matrix or the density of the matrix, might indicate to the machine learning model 407 which of the recommender systems 405 it should rely on. Asset or vulnerability information may be used to inform the machine learning model 407 as to the degree to which it should rely on the output features of certain ones of the recommender systems 405, etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for predicting vulnerabilities affecting assets of an enterprise system will now be described in greater detail with reference to FIGS. 7 and 8. Although described in the context of system 100, these platforms may also be used to implement at least portions of other information processing systems in other embodiments.

Figure 7:
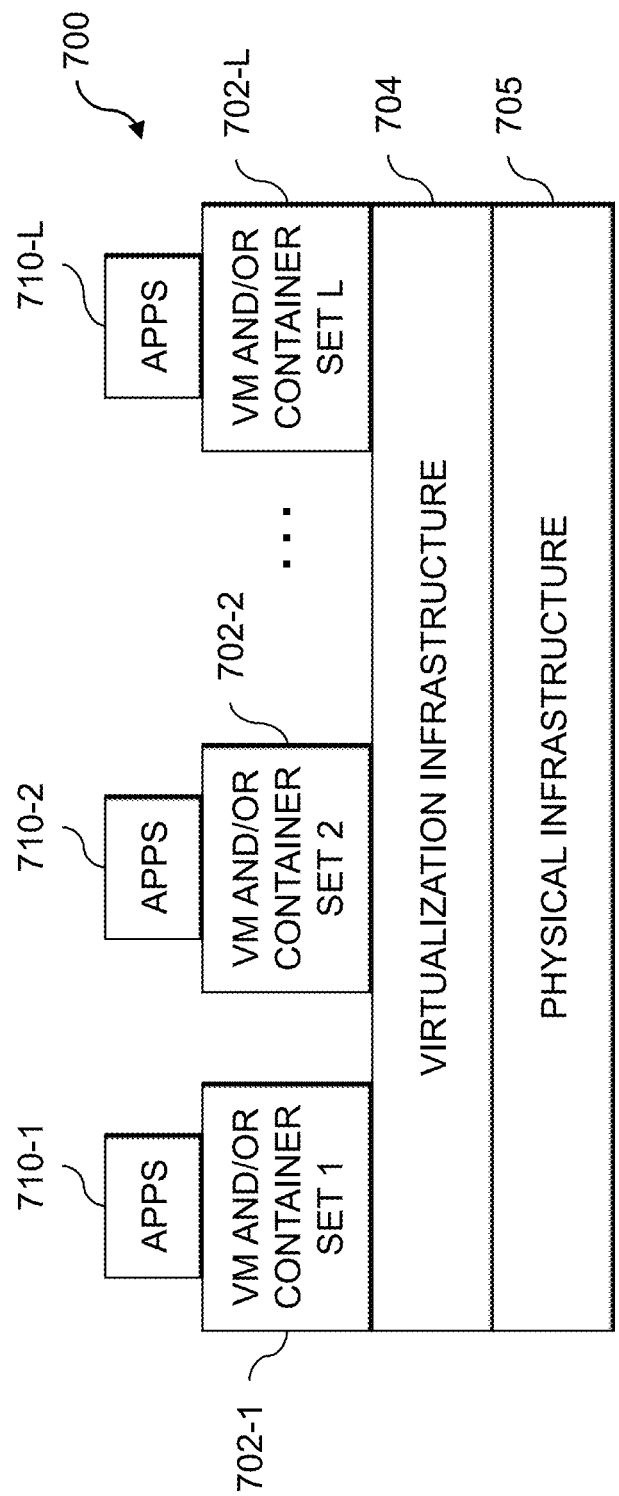
FIGS. 7 and 8 show examples of processing platforms that may be utilized to implement at least a portion of an information processing system in illustrative embodiments.
Figure 8:
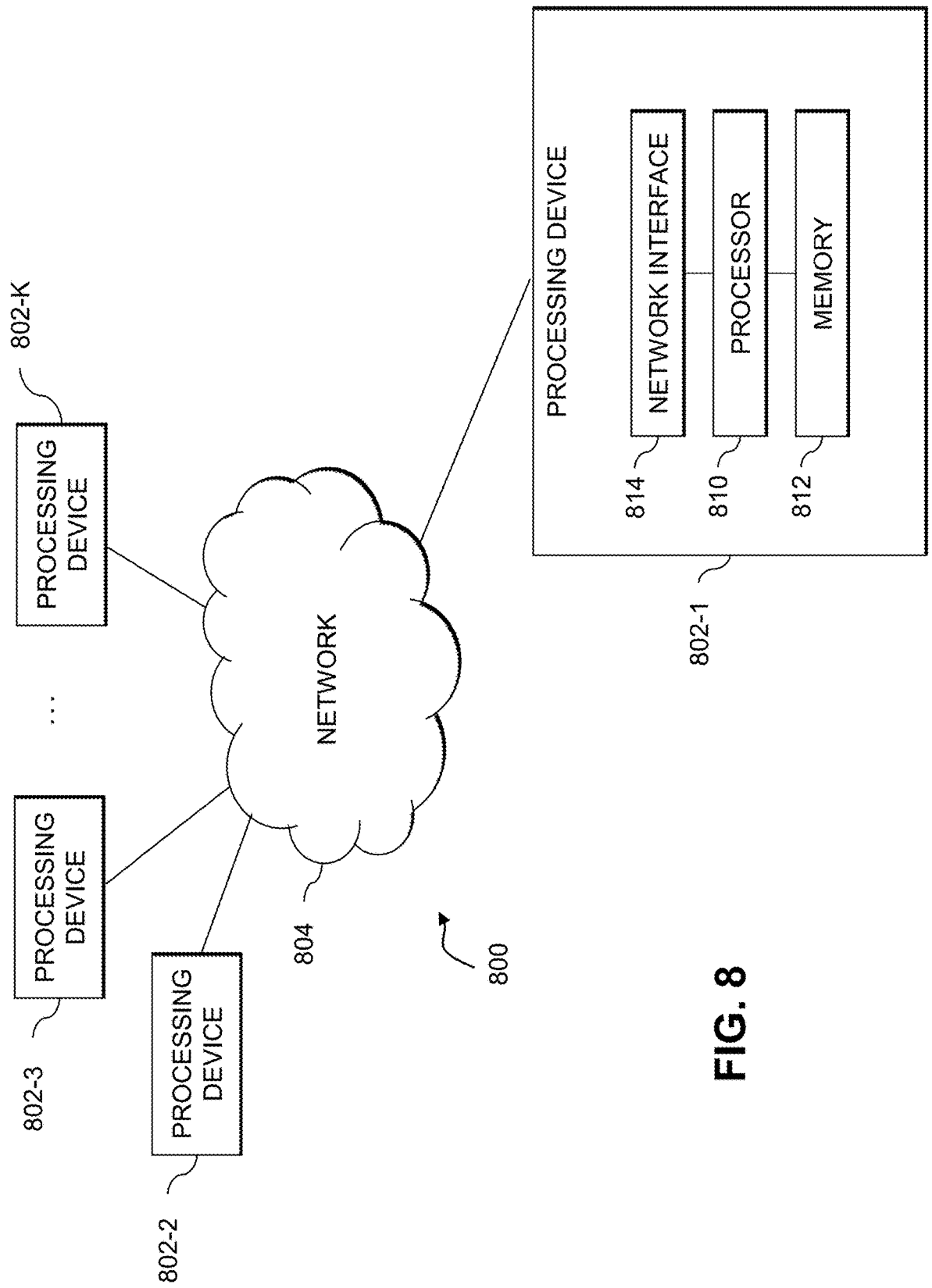

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments.

A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for predicting vulnerabilities affecting assets of an enterprise system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, enterprise systems, assets, recommender systems, machine learning models, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
    obtaining vulnerability scan results for a first subset of a plurality of assets of an enterprise system;
    populating an observation data structure, based at least in part on the obtained vulnerability scan results, indicating which of a plurality of vulnerabilities are observed on respective ones of the plurality of assets of the enterprise system;
    determining a set of recommendations for missing entries of the observation data structure for a second subset of the plurality of assets of the enterprise system utilizing at least one recommender system comprising at least one similarity function for determining similarity between a first set of vulnerabilities observed on one or more of the first subset of the plurality of assets and a second set of vulnerabilities observed on one or more of the second subset of the plurality of assets;
    predicting one or more vulnerabilities affecting one or more of the assets in the second subset of the plurality of assets utilizing a machine learning model and the determined set of recommendations; and
    applying one or more remediation actions for remediating at least a given one of the predicted vulnerabilities affecting at least a given one of the one or more assets in the second subset of the plurality of assets;
    wherein the method is performed by at least one processing device comprising a processor coupled to a memory.

2. The method of claim 1 wherein the second subset of the plurality of assets comprises assets missing from the obtained vulnerability scan results.

3. The method of claim 1 wherein the second subset of the plurality of assets comprises assets whose associated vulnerability data in the obtained vulnerability scan results is more than a designated threshold amount of time prior to a current time.

4. The method of claim 1 wherein obtaining the vulnerability scan results comprises:
    identifying two or more clusters of the plurality of assets, a given cluster comprising two or more of the plurality of assets exhibiting at least a threshold level of similarity to one another;
    selecting at least one asset in each of the two or more clusters for inclusion in the first subset of the plurality of assets; and
    performing vulnerability scanning for the first subset of the plurality of assets.

5. The method of claim 4 wherein selecting at least one asset from the given cluster for inclusion in the first subset of the plurality of assets is based at least in part on relative asset criticalities of the two or more assets in the given cluster.

6. The method of claim 1 wherein the obtained vulnerability scan results comprise results obtained from two or more different vulnerability scanning tools, and wherein populating the observation data structure comprises converting vulnerability identifiers from each of the two or more different vulnerability scanning tools into a common taxonomy.

7. The method of claim 1 wherein the plurality of assets of the enterprise system are associated with respective unique asset identifiers, the plurality of vulnerabilities are associated with respective unique vulnerability identifiers, and the obtained vulnerability scan result entries each have one of the unique asset identifiers, one of the unique vulnerability identifiers, and a scan date identifier.

8. The method of claim 7 wherein populating the observation data structure comprises populating entries in an observation matrix for scan results with a scan date identifier within a designated threshold of a current time, each entry in the observation matrix indicating whether a given one of the unique vulnerability identifiers is observed on a given one of the unique asset identifiers.

9. The method of claim 1 wherein determining the set of recommendations for missing entries of the observation data structure for the second subset of the plurality of assets of the enterprise system comprises utilizing two or more recommender systems, each of the two or more recommender systems having an associated recommender model type and an associated hyperparameter configuration.

10. The method of claim 9 wherein the two or more recommender systems have at least one of:
   two or more different associated recommender model types, the two or more different recommender model types comprising at least two of: a collaborative filter recommender model, a Slope-One recommender model, and a matrix factorization recommender model; and
   two or more different associated hyperparameter configurations.

11. The method of claim 9 wherein the machine learning model weights recommendations for missing values provided by each of the two or more different recommender systems based at least in part on one or more of:
   dimensions of the observation data structure; and
   a density of the observation data structure.

12. The method of claim 1 wherein the at least one recommender system utilizes at least one of:
   a first hyperparameter specifying a first threshold number of similar assets to use for making a recommendation;
   a second hyperparameter specifying that recommendations are to be made only for ones of the plurality of vulnerabilities observed on at least a second threshold number of the plurality of assets;
   a third hyperparameter specifying that recommendations are to be made only for ones of the plurality of assets that have a least a third threshold number of the plurality of vulnerabilities;
   a fourth hyperparameter specifying that recommendations are limited to neighbor assets that have at least a fourth threshold number of the plurality of vulnerabilities in common with one another; and
   a fifth hyperparameter specifying that recommendations are limited to pairs of the plurality of assets that have a similarity score exceeding a fifth threshold number.

13. The method of claim 1 wherein the machine learning model comprises a nonlinear classifier, the nonlinear classifier comprising at least one of a random forest classifier and a neural network.

14. The method of claim 1 wherein the one or more remediation actions for remediating the given vulnerability comprise applying one or more security hardening measures to the given asset, a given one of the security hardening measures comprising at least one of:
   adding additional authentication mechanisms for accessing the given asset;
   placing the given asset behind a firewall in the enterprise system; and
   applying the patch to the given asset to remove the given vulnerability.

15. A computer program product comprising a non-transitory processor-readable storage medium having stored therein program code of one or more software programs, wherein the program code when executed by at least one processing device causes the at least one processing device to perform steps of:
   obtaining vulnerability scan results for a first subset of a plurality of assets of an enterprise system;
   populating an observation data structure, based at least in part on the obtained vulnerability scan results, indicating which of a plurality of vulnerabilities are observed on respective ones of the plurality of assets of the enterprise system;
   determining a set of recommendations for missing entries of the observation data structure for a second subset of the plurality of assets of the enterprise system utilizing at least one recommender system comprising at least one similarity function for determining similarity between a first set of vulnerabilities observed on one or more of the first subset of the plurality of assets and a second set of vulnerabilities observed on one or more of the second subset of the plurality of assets;
   predicting one or more vulnerabilities affecting one or more of the assets in the second subset of the plurality of assets utilizing a machine learning model and the determined set of recommendations; and
   applying one or more remediation actions for remediating at least a given one of the predicted vulnerabilities affecting at least a given one of the one or more assets in the second subset of the plurality of assets.

16. The computer program product of claim 15 wherein the second subset of the plurality of assets comprises assets missing from the obtained vulnerability scan results.

17. The computer program product of claim 15 wherein the second subset of the plurality of assets comprises assets whose associated vulnerability data in the obtained vulnerability scan results is more than a designated threshold amount of time prior to a current time.

18. An apparatus comprising:
   at least one processing device comprising a processor coupled to a memory;
   the at least one processing device being configured to perform steps of:
      obtaining vulnerability scan results for a first subset of a plurality of assets of an enterprise system;
      populating an observation data structure, based at least in part on the obtained vulnerability scan results, indicating which of a plurality of vulnerabilities are observed on respective ones of the plurality of assets of the enterprise system;
      determining a set of recommendations for missing entries of the observation data structure for a second subset of the plurality of assets of the enterprise system utilizing at least one recommender system comprising at least one similarity function for determining similarity between a first set of vulnerabilities observed on one or more of the first subset of the plurality of assets and a second set of vulnerabilities observed on one or more of the second subset of the plurality of assets;
      predicting one or more vulnerabilities affecting one or more of the assets in the second subset of the plurality of assets utilizing a machine learning model and the determined set of recommendations; and
      applying one or more remediation actions for remediating at least a given one of the predicted vulnerabilities affecting at least a given one of the one or more assets in the second subset of the plurality of assets.

19. The apparatus of claim 18 wherein the second subset of the plurality of assets comprises assets missing from the obtained vulnerability scan results.

20. The apparatus of claim 18 wherein the second subset of the plurality of assets comprises assets whose associated vulnerability data in the obtained vulnerability scan results is more than a designated threshold amount of time prior to a current time.

* * * * *